United States Patent [19]
Nakano

[11] Patent Number: 5,828,781
[45] Date of Patent: Oct. 27, 1998

[54] COLOR IMAGE REPRODUCING SYSTEM WITH IMAGE SIGNAL CORRECTION FUNCTION

[75] Inventor: Yoshiki Nakano, Tokyo, Japan

[73] Assignee: Toyo Ink Manufacturing Co., Ltd., Tokyo, Japan

[21] Appl. No.: 797,857

[22] Filed: Feb. 10, 1997

Related U.S. Application Data

[63] Continuation of Ser. No. 289,131, Aug. 11, 1994, abandoned.

[51] Int. Cl.$^6$ ........................................ G06K 9/00
[52] U.S. Cl. ..................... 382/167; 348/807; 356/405; 382/155
[58] Field of Search ........................ 382/155, 162, 382/167; 395/11; 348/807; 356/405

[56] References Cited

U.S. PATENT DOCUMENTS

| | | | |
|---|---|---|---|
| 5,200,816 | 4/1993 | Rose | 395/11 |
| 5,204,718 | 4/1993 | Morita | 395/11 |
| 5,285,297 | 2/1994 | Rose et al. | 395/11 |
| 5,343,243 | 8/1994 | Maeda | 348/222 |
| 5,376,963 | 12/1994 | Zoretea | 395/21 |
| 5,425,134 | 6/1995 | Ishida | 395/109 |

*Primary Examiner*—Yon J. Couso
*Assistant Examiner*—Jayanti K. Patel
*Attorney, Agent, or Firm*—Ladas & Parry

[57] ABSTRACT

When a required color image is to be output from a color image output device using an image input device for outputting color separation value signals corresponding to a read color image, if a change in image reproduction environment is detected by each of sensors provided to these devices, learning processing is properly executed. Using neural networks of a color conversion section and a color correction section which are optimized by the learning processing, a signal output from the image input device is color-converted and color-corrected. The color-corrected image signal (color separation value signals) is supplied to the color image output device to reproduce a color image. Since the learning processing is properly executed in correspondence with detection of an environmental variation by the sensors, the color image output device can stably keep reproducing the same color in consideration of the device characteristics including a physical change in temperature or humidity, and characteristics which change upon a change in color material such as inks, ribbons, or the like.

20 Claims, 10 Drawing Sheets

| IMAGE INPUT DEVICE NAME | | | COLOR IMAGE OUTPUT DEVICE NAME | | |
|---|---|---|---|---|---|
| COLOR SEPARATION VALUE | | | COLORIMETRIC VALUE | | |
| C (%) | M (%) | Y (%) | L* | a* | b* |
| 0 | 0 | 0 | $L_0$ | $a_0$ | $b_0$ |
| 0 | 0 | 25 | $L_1$ | $a_1$ | $b_1$ |
| ⋮ | ⋮ | ⋮ | ⋮ | ⋮ | ⋮ |
| 100 | 100 | 100 | $L_{125}$ | $a_{125}$ | $b_{125}$ |

F I G. 3

| DEVICE NAME | ▨ | |
|---|---|---|
| LAYER STRUCTURE | 3 LAYERS | |
| NO. OF UNITS | INPUT | 3 |
| | INTERMEDIATE | 9 |
| | OUTPUT | 3 |
| WEIGHT | $W_{11}$ | ○○ WEIGHT |
| | $W_{12}$ | △△ WEIGHT |
| | ⋮ | ⋮ |

F I G. 4

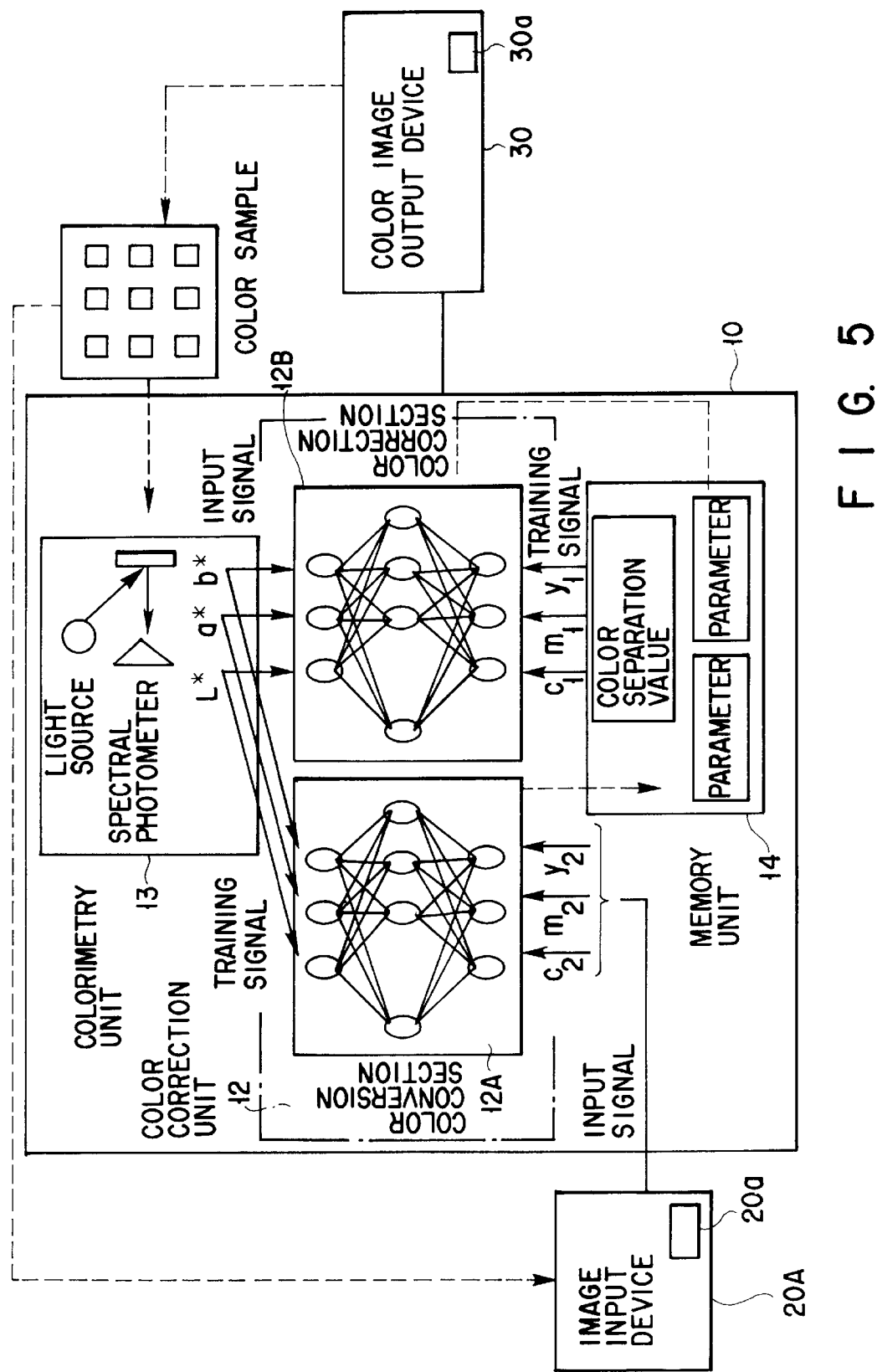
F I G. 5

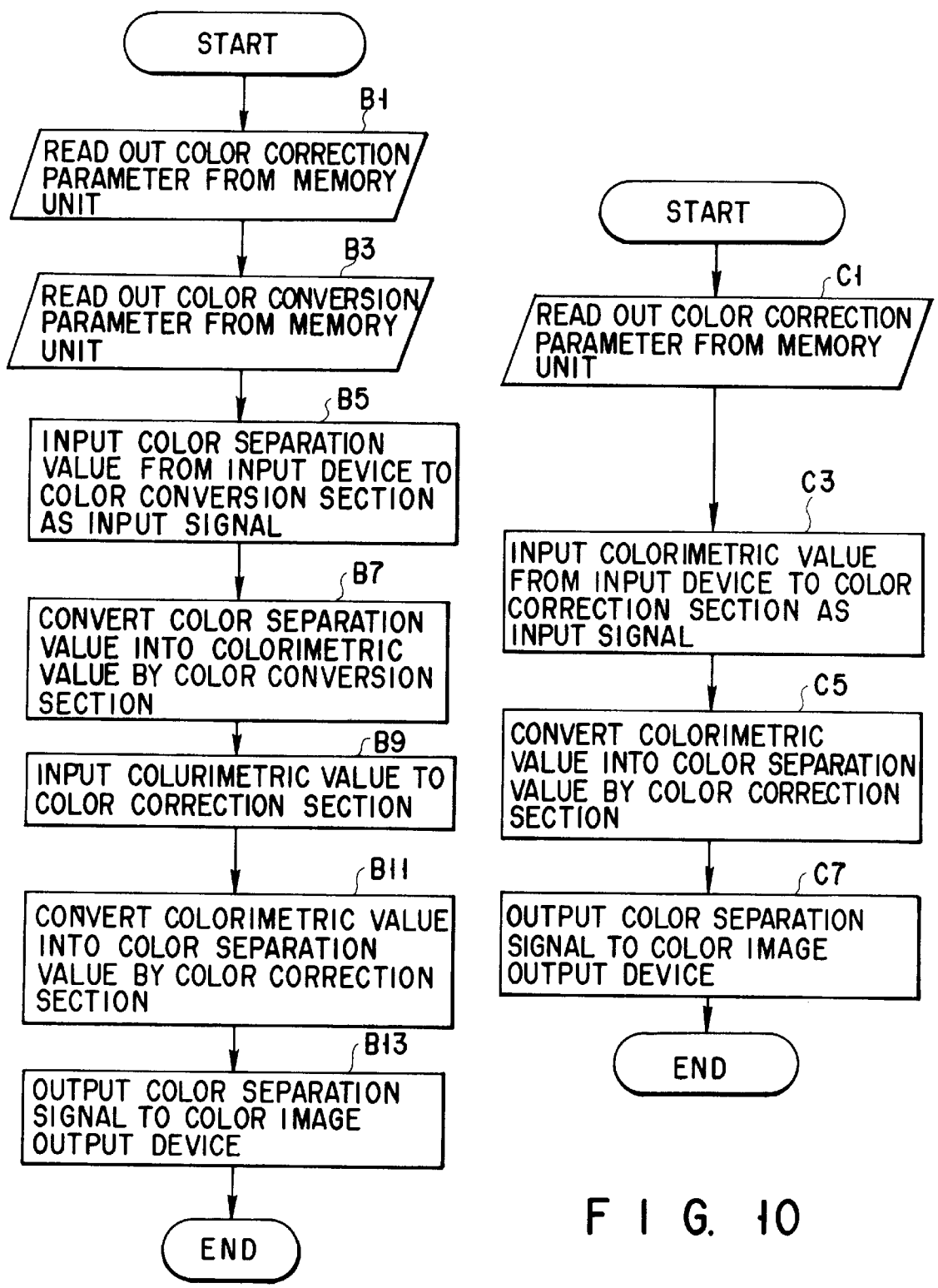
F I G. 8
F I G. 10

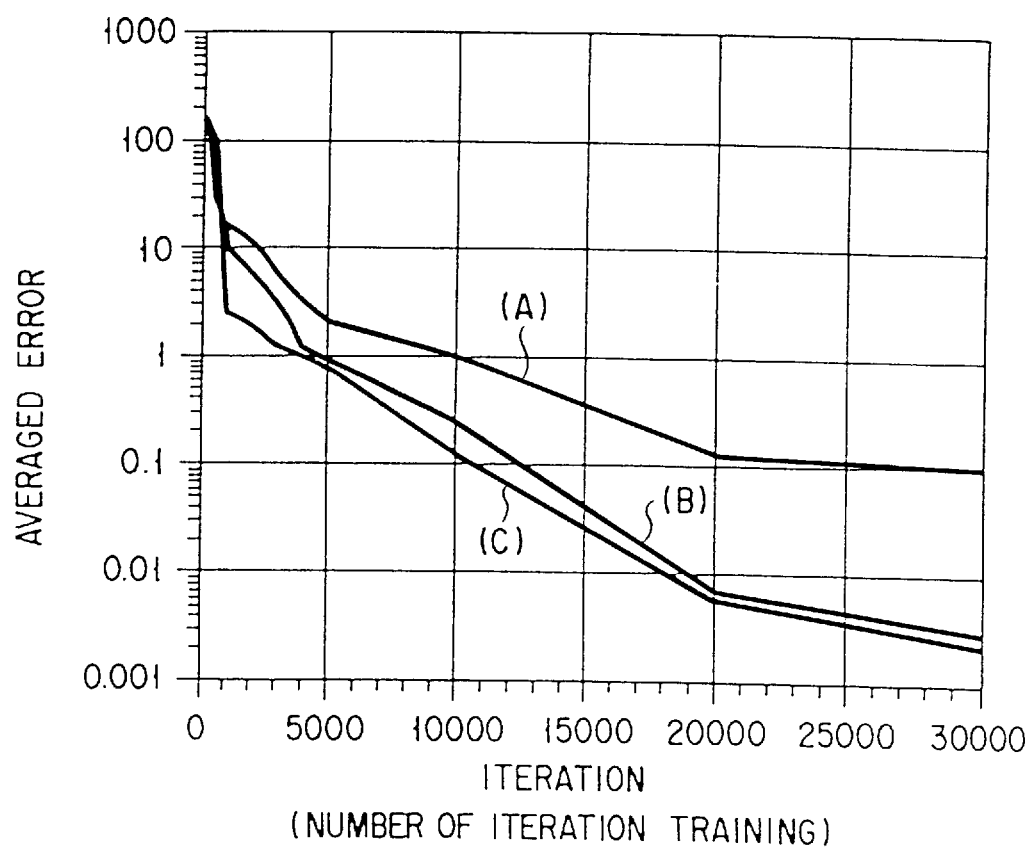
F I G. 12

COLOR IMAGE REPRODUCING SYSTEM WITH IMAGE SIGNAL CORRECTION FUNCTION

This application is a continuation of application Ser. No. 08/289,131 filed on Aug. 11, 1994, now abandoned.

BACKGROUND OF THE INVENTION

1. Field of the Invention

The present invention relates to a color image reproduction system for reproducing a target color image using an image output device such as a color printer, a color copying machine, a color facsimile device, a color monitor, or the like and, more particularly, to a color image reproduction system having an image signal correction function, which system can accurately reproduce a target color even when the environment upon reproduction of a color image changes, for example, when the humidity, temperature, or the like changes, or when the color material used in the device is exchanged.

2. Description of the Related Art

In recent years, devices for outputting color images such as a color printer, a color copying machine, a color facsimile device, and the like have become popular. In the field of process print, the above-mentioned color image output devices are often connected to, e.g., personal computers and are used as plain proof machines. However, in such a case, the colors of a color image output from a color image output device cannot be stabilized depending on various conditions.

The above-mentioned color image output device reproduces a color image using three primary color ink ribbons, three primary color toners, or the like in accordance with three primary color original image signals. For example, when three primary color ink ribbons are used, inks of the ink ribbons are transferred onto a recording sheet in accordance with the original image signals. When three primary color toners are used, latent images of the primary colors are developed by the corresponding color toners in accordance with the original image signals, and are transferred and fixed onto a recording sheet.

When various color images (colors) are artificially displayed using the three primary colors, different colors are assigned to a plurality of sub-area regions which are independent of each other or partially overlap each other in a very small area for expressing an arbitrary color. The arbitrary color is recognized visually by mixing of these colors.

Such a technique includes the subtractive color mixing process and the additive color mixing process. In the subtractive color mixing process, three primary colors, i.e., C (cyan), M (magenta), and Y (yellow) (and K (black) in some cases) are used. In the additive color mixing process, three primary colors, i.e., R (red), G (green), and B (blue) are used. In correspondence with the ratios of these primary colors, a color recognized by man is determined. Therefore, when a color image (colors) is to be expressed, values representing the ratios of the three primary colors (to be referred to as color separation values) are used. As the color separation values to be supplied to the above-mentioned color image output device, CMY values of a CMY(K) system or RGB values of an RGB system are known. Also, signals indicating the color separation values will be referred to as color separation value signals hereinafter.

On the other hand, the color separation values have a device-dependent feature (depending on the characteristics of output devices), i.e., a color image (colors) to be output varies depending on the characteristics of a color image output device to be used. More specifically, when the same color separation value signals are supplied to color image output devices having different characteristics, color images output from these color image output devices have different colors. As the characteristics of a color image output device, a method of displaying a color image is known. The method of displaying the color image includes, e.g., a sublimation type thermal transfer method, an ink-jet method, and the like.

Furthermore, even when color image output devices having the same characteristics are used, and the same color separation value signals are supplied thereto, the colors of output color images vary depending on a change in use environment of the color image output devices, i.e., a change in temperature and a change in humidity. Furthermore, in a color image output device such as a color printer, a color copying machine, or the like, the colors of output color images vary depending on a change in color material such as ink ribbons, toners, and the like or a change in recording sheet to be used. In this manner, the output color image varies depending not only on a difference in image display method of the color image output device but also on a change in other reproduction environment. FIG. 1 schematically shows such problems.

As described above, in a color image output device, since the output color image varies depending on a change in reproduction environment in which the device is used, it is difficult to stably keep reproducing identical color images.

For this reason, as a method of correcting an image signal so as to reproduce a target color in the color image output device, a look-up table method is known. In this method, color separation value signals which are determined in consideration of the characteristics of a given color image output device to be used are stored in a look-up table in correspondence with color separation value signals input to a control device (see FIG. 1), and when color separation value signals are input to the control device, the color separation value signals for the color image output device are read out, thereby correcting the input signals.

However, in such a look-up table, a required number of correspondences between input and output color separation value signals must be obtained in advance. In addition, even when conversion between input and output color separation value signals having a nonlinear relationship therebetween is possible, detailed data must be prepared to achieve this conversion, and a large volume of data must be stored. Furthermore, such a large volume of data must be prepared again when the color image output device to be used is exchanged, when the color materials such as ribbons, toners, and the like are exchanged, or when the above-mentioned reproduction environment changes.

Also, a method of correcting color separation value signals using arithmetic formulas is also available. However, since this method can only achieve approximation based on experimental values, matching of details cannot always be accurately executed.

SUMMARY OF THE INVENTION

It is an object of the present invention to provide a color image reproduction system which can reproduce identical color images with respect to identical color image signals upon reproduction of a color image using a color image output device even when the reproduction environment changes due to a change in temperature or humidity or a change in color material such as ribbons, toners, and the like.

According to a first aspect of the present invention, there is provided an image signal correction device, which is connected to a color image output device having a function of outputting a color image in correspondence with a color separation value signal and a function of outputting a standard color sample in correspondence with predetermined color separation value signals and connected to a reading device for generating color separation signals by reading the color sample, comprising: colorimetry means for generating colorimetric value signals by colorimetrically measuring the color sample; first conversion means, comprising a neural network, for converting a color separation value signal into a colorimetric value signal; second conversion means, comprising a neural network, for converting a colorimetric value signal into a color separation value signal; first conversion control means for executing learning of the first conversion means in a learning mode, so that the color separation value signals of the standard color sample generated by the reading means are converted into the colorimetric value signals of the standard color sample generated by the colorimetry means, and for converting a color separation value signal of an object to be reproduced generated by the reading means into a colorimetric value signal using the first conversion means and outputting the converted colorimetric value signal in an image output mode; and second conversion control means for executing learning of the second conversion means in the learning mode, so that colorimetric value signals of the standard color sample generated by the colorimetry means are converted into the predetermined color separation value signals, and for converting the colorimetric value signal output from the first conversion means into a color separation value signal using the second conversion means and outputting the converted color separation value signal to the color image output device in the image output mode.

According to a second aspect of the present invention there is provided an image signal correction device, which is connected to a color image output device having a function of outputting a color image in correspondence with a color separation value signal and function of outputting a standard color sample in correspondence with predetermined color separation value signals and connected to a processing device for generating color separation signals by reading the color sample, comprising: colorimetric means for generating colorimetric value signals by colorimetrically measuring the color sample; first conversion means, comprising a neural network, for converting a color separation value signal into a colorimetric value signal; second conversion means, comprising a neural network, for converting a colorimetric value signal into a color separation value signal; and processing means, when the image signal correction device is in a learning mode, for executing learning of the first conversion means, so that the color separation value signals of the standard color sample generated by the processing device are converted into the colorimetric value signals of the standard color sample generated by the colorimetry mean and learning of the second conversion means, so that the colorimetric value signals of the standard color sample generated by the colorimetry means are converted into the predetermined color separation value signals, and when the image signal in an image output mode, for converting a color separation value signal of an object to be reproduced generated by the reading means into a colorimetric value signal using the first conversion means, converting the colorimetric value signal output from the first conversion means into a color separation value signal using the second conversion means, and outputting the converted color separation value signal to the color image output device.

In each of the arrangement according to the first and second aspect of the present invention, when a required color image is to be output from the color image output device using the image input device (reading device or processing device) for outputting color separation value signals corresponding to a read or output color image, the learning processing is executed properly. Using the neural networks of first and second conversion means (a color conversion section and a color correction section) which are optimized by the learning processing, signals output from the color image input device are color-converted and then color-corrected. The color-corrected image signals (color separation value signals) are supplied to the color image output device, thereby reproducing a color image. The color image reproduced by the color image output device is one corresponding to the color separation values which are converted on the basis of the colorimetric values of the standard color samples, thereby outputting a color image with a required color tone. Furthermore, sensors to detect an environmental variation may be provided at the image input device and the color image output device. Since the learning processing is properly executed in correspondence with detection of an environmental variation by the sensors, the color image output device can stably keep reproducing the same color in consideration of the device characteristics, including a physical change such as a change in temperature or humidity, of the image input device and the color image output device, and characteristics which change upon a change in, e.g., color materials such as ink ribbons.

As described above, according to the present invention, when a color image is output from a single color image output device, color reproducibility can be assured, so that identical colors can be reproduced for identical color image signals without being influenced by chemical and physical factors, e.g., a change in temperature or humidity condition, a change in ribbons or toners, and the like.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a table showing an example of color separation values and colorimetric values stored in the form of a table in a memory unit shown in FIG. 2;

FIG. 4 is a table showing an example of parameters stored in the memory unit shown in FIG. 2;

FIG. 5 is a functional block diagram showing a learning processing function of the color image reproduction system when an image input device connected to an image signal correction device shown in FIG. 2 is of a type for outputting color separation values;

FIG. 8 is a flow chart showing the operation of the color image reproduction system shown in FIG. 7;

FIG. 10 is a flow chart showing the operation of the color image reproduction system shown in FIG. 9;

FIG. 12 is a graph showing a relationship, in a neural network, between a averaged error and a iteration training in case that a intermediate layer is constituted five units, nine units, and eleven units.

DETAILED DESCRIPTION OF THE PREFERRED EMBODIMENTS

A color image reproduction system according to an embodiment of the present invention will be described below with reference to the accompanying drawings.

Figure 1:
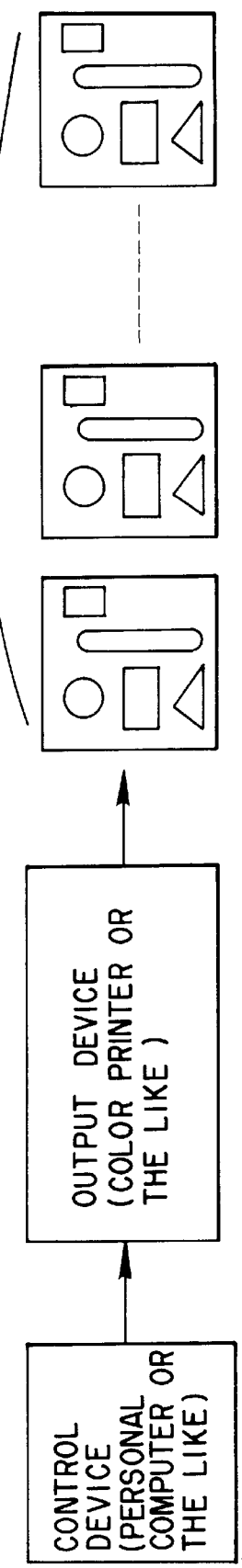
FIG. 1 is a schematic view (prior art) for explaining a conventional problem that different color images are output depending on a change in reproduction environment even when an identical color image output device is used.
Figure 2:
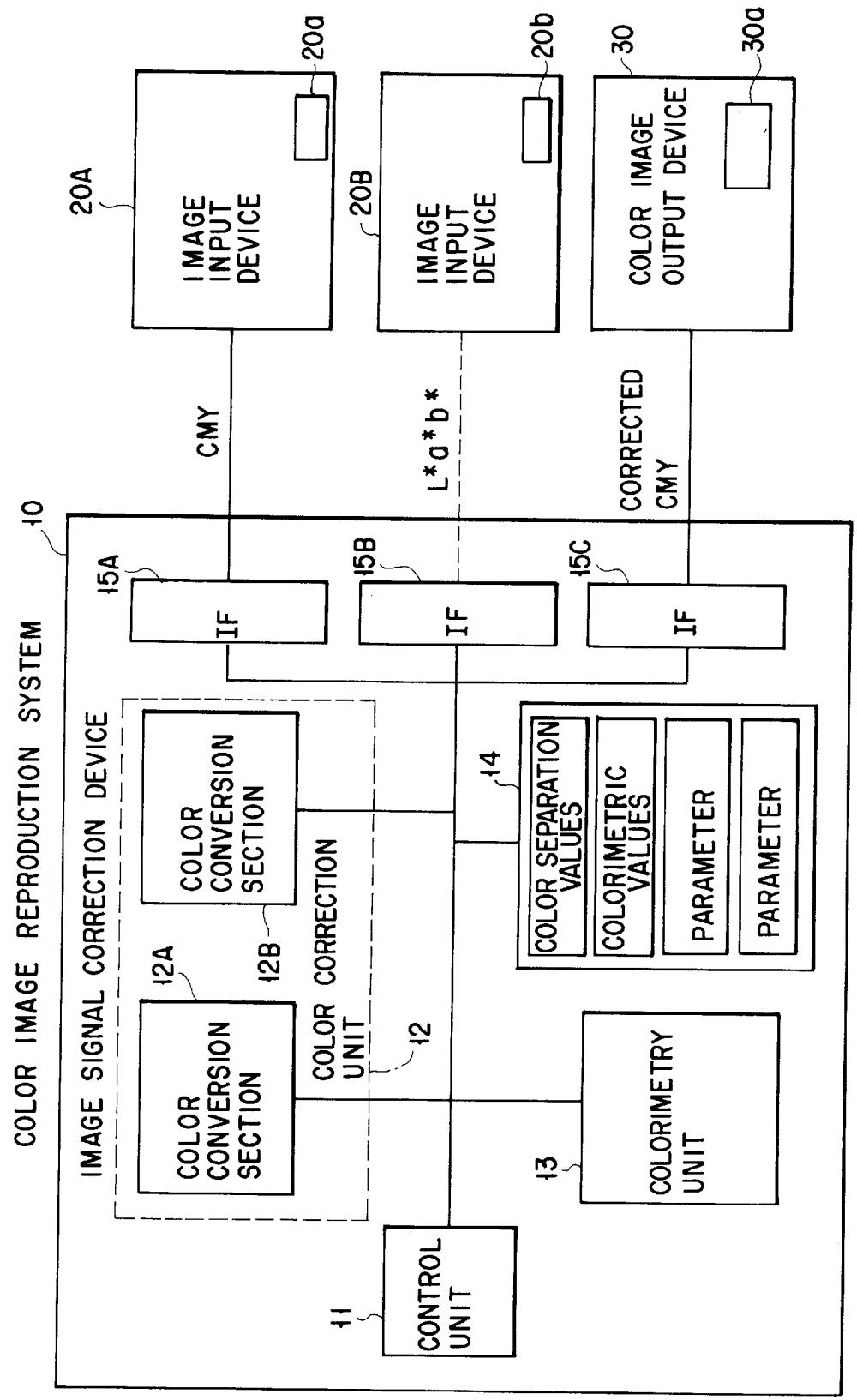
FIG. 2 is a block diagram showing the arrangement of a color image reproduction system having an image signal correction function according to an embodiment of the present invention.

FIG. 2 shows the arrangement of a color image reproduction system according to the present invention. As shown in FIG. 2, the color image reproduction system comprises an image signal correction device 10, an image input device 20A or 20B, and a color image output device 30.

The image signal correction device 10 executes learning and correction processing for correcting first color separation value signals (CMY), sent from the image input device 20A or colorimetric value signals (L*a*b*) sent from the image input device 20B to second or third color separation value signals (Corrected CMY) for the color image output device 30, so that target image colors are output by the color image output device 30. Note that either of the two different image input devices 20A and 20B can be connected to the image signal correction device 10 and that the image input device 20A outputs color separation value signals but the image input device 20B outputs colorimetric value signals to the image signal correction device.

The color separation values and the colorimetric values of the corresponding value signals will be described below. The color separation values express sensed colors using ratios of the primary colors. The primary colors are C (cyan), M (magenta), and Y (yellow) (and K (black) in some cases) in the subtractive color mixing process or R (red), G (green), and B (blue) in the additive color mixing process.

The colorimetric values are values defined in a uniform color space such as the CIE L*a*b* space, XYZ space, or the like, and include an L*a*b* colorimetric system and an XYZ colorimetric system. In these colorimetric systems, a color is displayed in the form of a set of three numerical values.

The L*a*b* colorimetric system is one recommended by the CIE (Commission Internationale de l'Eclairage) in 1976, and is a uniform color space which is defined so that a predetermined distance between two colors displayed on this coordinate system corresponds to a predetermined perceptive color difference on any color region. An L* value represents the degree of lightness of a color, and a combination of a* and b* values represent the relationship between the hue and saturation of a color.

The XYZ colorimetric system is one associated with data of a standard observer adopted by the CIE in 1931, and is defined by tristimulus values calculated using color matching functions $x(\lambda)$, $y(\lambda)$, and $z(\lambda)$. Values (colorimetric values) defined in these spaces are the values of colors themselves which are independent of the characteristics of input/output devices, i.e., device-independent values.

In this manner, the colorimetric values express, as numerical values, the lightness, hue, and saturation (in the L*a*b* colorimetric system, L* represents the lightness, and a* and b* represents chromaticity, ie. hue and the saturation. These numerical values are indices for objectively and quantitatively expressing colors. IN this embodiment, color separation and colorimetric value signals of the subtractive color mixing and L*a*b* colorimetric system will be referred to as CMY and L*a*b* signals hereinafter.

As shown in FIG. 2, the image signal correction device 10 comprises a control unit 11, a color correction unit 12, a colorimetry unit 13, a memory unit 14, and various interfaces (IFs) 15A to 15C. The control unit 11 controls the entire image signal correction device 10, and also controls transmission/reception of data and commands among these units.

The color correction unit 12 includes a color conversion section 12A and a color correction section 12B. The color conversion section 12A and the color correction section 12B comprise neural networks (neuro-computers). As the neural networks, multi-layered feedforward coupling type neural networks are adopted. Various methods are available as the learning method of these networks. For example, the steepest descent method of the back propagation algorithm (see Runmelhart, D. E and McClelland, J. L.(Eds), "Parallel Distributed Processing", Exploration in the Microstructure of Cognition. Vol 1, 2, MIT Press Cambridge (1989), and the like, or Ochiai et al., *Toyohashi KagakuGijitsu Daigaku*, and the like) is adopted.

Note that, in this embodiment, the neural networks constituting the color correction unit 12 each include three layers with an input layer that each and an output layer consist of three units, and an intermediate layer that consists of nine units. However, construction of the neural networks is not limited to the above construction.

FIG. 12 shows a relationship between an averaged error and iteration training of a neural network. The neural network consists of three layers. An input layer and an output layer of the neural network include three units respectively. A line (A) indicates the relationship of the neural network including an intermediate layer consisting of five units. A line (B) indicates the relationship of the neural network including an intermediate layer consisting of nine units. A line (C) indicates the relationship of the neural network including an intermediate layer consisting of eleven units. As a difference in the averaged error between the line (A) and the line (B) is small, the neural network including the intermediate layer consisting of nine units is applied to this embodiment. Note that, a neural network including equal to or more than three layers or a neural network consisting of layers including equal to or more than three units respectively, may be applied to the present invention so as to reduce the average error.

The color conversion section 12A converts color separation value signals into colorimetric value signals, and the color correction section 12B converts colorimetric value signals into color separation value signals (corrected cmy signals) by correcting them in correspondence with the color reproduction characteristics of the color image output device 30.

The color conversion section 12A executes learning processing under the control of the control unit 11. In a learning mode, the color conversion section 12A receives, as training signals, L*a*b* signals obtained by colorimetrically measuring a print CS of a standard color sample output from the color image output device 30 using the colorimetry unit 13, and also receives cmy signals (color separation value signals obtained by reading the print CS of the standard color sample when the color image input device 20A comprises an image scanner) of the standard color sample obtained by the color image input device 20A. The color conversion section 12A executes learning, so that the L*a*b* signals as the training signals are obtained from the input cmy signals.

The color correction section 12B executes learning processing under the control of the control unit 11 as in the color conversion section 12A. In a learning mode, the color correction section 12B receives L*a*b* signals from the colorimetry unit 13, and also receives, as training signals, cmy signals of a standard color sample of the CMY(K) system corresponding to the color sample from the memory unit 14. The color correction section 12B executes learning, so that cmy signals corresponding to the color sample are obtained from the input L*a*b* signals.

The colorimetry unit 13 reads a standard color sample output from the color image output device 30, and converts read signals into colorimetric values, e.g., L*a*b* signals. The colorimetry unit 13 adopts a spectral photometer. The spectral photometer is a device for displaying a color as numerical values. The spectral photometer radiates light onto an object, measures the intensity of light reflected by or transmitted through the object by utilizing the spectrophotoelectric principle, displays colorimetric values as a set of three numerical values obtained by calculating the measured value as a predetermined arithmetic method, or spectrum reflectances. Basically, the colorimetry unit 13 is constituted by a light source and the spectral photometer. In this embodiment, the colorimetry unit 13 calculates measured values using a predetermined arithmetic method, and outputs colorimetric values as a set of three numerical values as L*a*b* signals.

The memory unit 14 stores the color separation values (cmy values) used as the training signal in the neural network of the color correction section 12B, the colorimetric values (L*a*b* values) of the standard color sample colorimetrically measured by the colorimetry unit 13, and parameters of the neural networks which have undergone learning. The color separation values and the colorimetric values may be stored in the form of a table to clarify their correspondence, as shown in FIG. 3. Note that the color separation values and the colorimetric values are stored in units of various combinations of image input devices and color output devices, as shown in FIG. 3. The parameters are read out in an image output mode after the end of learning processing, and are used in processing of the neural networks. The parameters are stored and used in units of image input devices and color image output devices. FIG. 4 shows an example of parameters. As shown in FIG. 4, the parameters include a corresponding device name (an image input device name and color image output device name), the layer structure of the neural network, the number of units of each layer, a weight associated with an input of each unit, and the like. Furthermore, the parameters include environment information. The environment information represents information such as temperature and humidity where a leaning processing is executed, time at starting of change mount printing, time at changing color material, a type of the color material and the like.

The IFs 15A to 15C have terminals for respectively exchanging data with the image input devices 20A and 20B, and the color image output device 30, and for connecting these devices. The IF 15A receives CMY signals as color separation value signals from the image input device 20A, and the IF 15B receives L*a*b* signals as colorimetric value signals from the image input device 20B. The IF 15C is connected to the color image output device 30 used in color reproduction processing, and cmy signals are sent to the color image output device 30 via the IF 15C.

The image input devices 20A and 20B each comprise, e.g., a color image reader, a color television camera, a personal computer, or the like. The image input device 20A outputs color separation value signals (cmy signals of the CMY(K) system in this embodiment) of, e.g., a color image to the image signal correction device 10. On the other hand, the image input device 20B outputs colorimetric value signals (L*a*b* signals in this embodiment) of, e.g., a color image to the image signal correction device 10. Note that the image input devices 20A and 20B comprise sensors 20a and 20b for detecting a change in environment in image input processing. An operator can recognize, based on the outputs from the sensors 20a and 20b, a change in environment in image input processing. The change in environment includes a change in temperature or humidity.

The color image output device 30 receives color separation value signals (corrected cmy signals) from the image signal correction device 10, and outputs a color print corresponding to the received signals. The color image output device 30 corresponds to a color printer, a color copying machine, a color facsimile device, or the like, but may comprise an image display device such as a color video monitor in addition to a device for outputting a hard copy.

Note that the color image output device 30 has a function of outputting a predetermined standard color sample. The color image output device 30 outputs the standard color sample by a predetermined number of colors in correspondence with specific color separation values, e.g., cmy signals for outputting a specific color sample of the CMY(K) system. Furthermore, the color image output device 30 comprises a sensor 30a for detecting a change in color image reproduction environment. The sensor 30a informs, to an operator or the like, that an environment has changed from one corresponding to learning processing executed for the color correction unit 12. For example, the sensor 30a informs the end of a predetermined amount of print operations, a change in print color material used in the color image output device 30, and a change in predetermined temperature or humidity. Thus, the operator or the like who monitors the reproduction processing of color images can recognize the change in image reproduction environment.

Various processing operations executed when the image input device 20A is used will be described below with reference to the accompanying drawings.

In the color image reproduction system of this embodiment, the color image output device 30 outputs a standard or color sample (CS in FIG. 5) having known color separation values from which first colorimetric values (L*a*b* values) are obtained using the colorimetry unit 13.

Conversion characteristics are given to the color conversion section 12A, so that first color separation value signals (cmy values) of the color sample from the image input device 20A are corrected to yield second colorimetrics value signals that coincide with the first colorimetric value signals of the color sample from the colorimetric unit 13, or conversion characteristics are given to the color correction section 12B so that its second color separation value signals from the second colorimetric value signals coincide with the known color separation values of the color sample. In this manner, a learning mode for causing the color image output device 30 to output the standard color sample, and executing learning of the color conversion section 12A or the color correction section 12B by utilizing the color sample is properly executed upon detection of a change in environment by the sensor 30a arranged in the color image output device 30. With this processing, cmy signals output from the image input device 20A can be subjected to color correction in correspondence with the current characteristics of the image input device 20A or the color image output device 30, and the corrected cmy signals can be supplied to the color image output device 30, thus assuring stable color reproducibility.

For this purpose, the color sample CS having known color separation values is prepared. The standard color sample CS is a sheet of color sample on which a plurality of blocks each having a predetermined size are filled with different single colors and are displayed next to each other.

When the color image output device 30 is a printer or a facsimile device, it can output the above-mentioned standard color sample in a specific mode such as a calibration mode provided to the device, and such a color sample is utilized. However, if a device does not have such a mode, output means for the standard color sample CS is arranged in the image signal correction device 10, and when an operator inputs a standard color sample output command, signals of the above-mentioned standard sample CS are output to the color image output device 30. Note that an input section for accepting the command or the like is not shown.

In the image signal correction device 10, color separation values corresponding to the colors (standard colors) of respective blocks on the standard color sample are set in advance in the memory unit 14, so as to be designated and read out in units of standard colors.

In order to assure color reproducibility, the image signal correction device 10 must be calibrated. Such calibration is achieved by measuring, using the sensors 20a and 30a, the characteristics (environment) of the image input device 20A and the color image output device 30 periodically or as needed depending on the state, and executing learning of the neural networks of the color correction unit 12 to have an optimal state. Learning processing is executed any time as needed, e.g., at the beginning of a large amount of print operations, after a rest, every time a predetermined number of prints are output, when toners or ribbons are exchanged, and so on.

Figure 6:
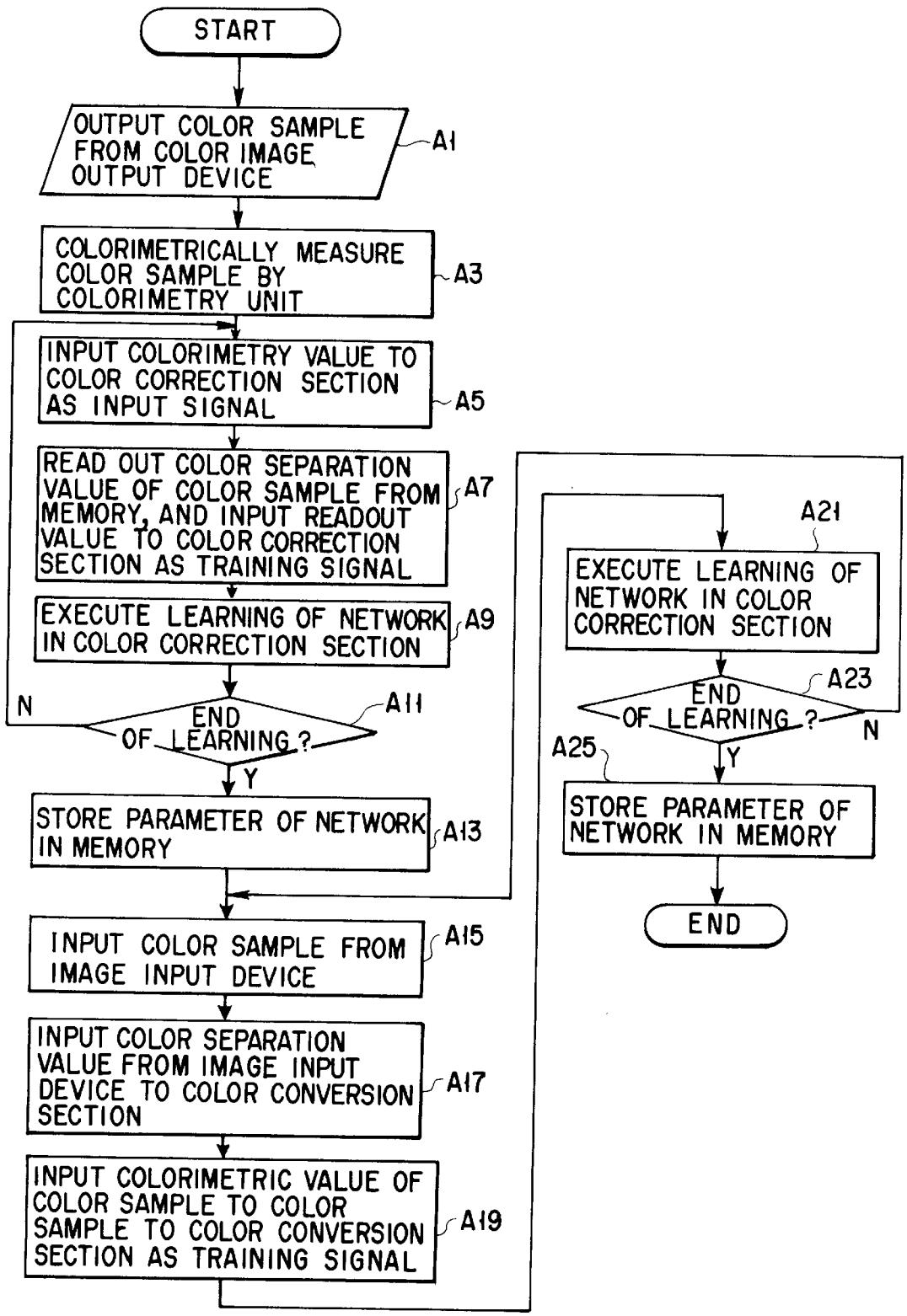
FIG. 6 is a flow chart showing the operation of the color image reproduction system shown in FIG. 5.

The learning operation of the color image reproduction system upon execution of color image reproduction using the image input device 20A will be described below with reference to FIGS. 5 and 6. FIG. 5 is a functional block diagram for explaining the learning operation, and FIG. 6 is a flow chart showing the operation.

When the learning operation is to be executed, the image signal correction device 10 is set in the learning mode, and a learning execution command is supplied thereto. The mode setting operation and the command input operation are achieved by operating an input unit (not shown) provided to the image signal correction device 10.

In the learning mode, first, the color image output device 30 outputs the standard color sample (step A1). The output standard color sample CS is colorimetrically measured using the colorimetry unit 13 of the image signal correction device 10 (step A3). The colorimetry operation of the colorimetry unit 13 sequentially reads the standard color blocks on the standard color sample CS one by one.

The control unit 11 stores values represented by colorimetric value signals (L*a*b* signals) output from the colorimetry unit 13 in the predetermined order (the sequential reading order of the standard color blocks) in the memory unit 14. The control unit 11 outputs each L*a*b* signal to the color correction section 12B simultaneously with its storage in the memory unit 14 (step A5). The control unit 11 reads out corresponding color separation values ($C_1, M_1, Y_1$) in the sequential reading order of the standard color blocks from the memory unit 14 and supplies the read out color separation values to the color correction section 12B as training signals (step A7).

Thereafter, the color correction section 12B executes learning of the neural network using the color separation value signals (those indicating the color separation values $C_1$, $M_1$, and $Y_1$) read out from the memory unit 14 as training signals and the colorimetric value signals output from the colorimetry unit 13 as input signals so that the outputs (i.e. corrected CMY signals of FIG. 2) approach the training signals (step A9).

Because each training signal indicates a correct answer for corresponding input, learning means that the strength of each coupling (i.e., weighting) in the network is changed, so that the output color value separation signals for the input colorimetric value signals coincide with the training signals.

The degree of learning is discriminated by checking if a predetermined level is attained with respect to the training signals (step A11). More specifically, the color correction section 12B receives the colorimetric values corresponding to the color sample as the inputs of the neural network, and changes the coupling strength in the neural network repetitively from, e.g., an initial condition, so that the outputs of the neural network for the inputs approach the values of the training signals. Such a processing operation is repeated a number of times, thus executing learning of the neural network of the color correction section 12B. Thus, the neural network of the color correction section 12B learns color correction characteristics based on the colorimetric values and color blend (e.g., CMYK dot area ratios) of the standard color sample.

Upon completion of learning (YES in step A11), various parameters of the neural network at that time are stored in the memory unit 14 (step A13).

The operator then reads the standard color sample CS using the color image input device 20A (step A15). The color image input device 20A reads the standard color sample CS, and sequentially outputs color separation value signals of the three primary colors, e.g., signals of the CMY(K) system $C_2$, $M_2$, and $Y_2$ in FIG. 5 in correspondence with the order of the standard color blocks of the standard color sample. There output signals are supplied to the image signal correction device 10 (step A17).

The control unit 11 sends the supplied input signals to the color conversion section 12A of the color correction unit 12. Note that the standard color blocks are arranged in a matrix on the standard color sample CS, and the color image input device 20A sequentially outputs color separation values of different standard color blocks. The control unit 11 temporarily stores these color separation values in a predetermined area (e.g., a frame memory) of the memory unit 14, so that these values can be utilized one by one later.

In this manner, color separation value signals of standard color blocks are input to the neural network of the color conversion section 12A. The control unit 11 also inputs colorimetric values of the same standard color blocks as those read by the image input device 20A from the colorimetry unit 13 to the neural network of the color conversion section 12A (step A19). Note that the control unit 11 may use colorimetric value signals already stored in the memory unit 14 as just described for color correction section 12B. The color conversion section 12A then executes learning of its neural network using the colorimetric value signals from the colorimetry unit 13 as training signals, so that output signals corresponding to input signals approach the supervising signals (step A21).

The learning of the neural network in the color conversion section 12A is repeated a number of times, and when output signals corresponding to input signals fall within a predetermined range as compared to the training signals as reference signals, the learning of the neural network of the color conversion section 12A ends (YES in step A23). After the end of learning, the control unit 11 stores various parameters of the neural network in the memory unit 14 (step A25).

With the above-mentioned learning processing, the color conversion section 12A can convert color separation value signals of the standard colors (the colors corresponding to the standard color sample) into corresponding colorimetric value signals in consideration of the characteristics of the image input device 20A. Also, the color correction section 12B can convert color separation value signals output from the color conversion section 12A into color separation value signals, which allow the color image output device 30 to output the standard colors corresponding to the color separation values.

The colorimetric values are quantitative values for colors and do not depend on output devices. When the color image output device 30 to be used outputs the standard color sample having known color separation values, and the standard color sample is colorimetrically measured, colorimetric values defined by, e.g., the $L^*a^*b^*$ colorimetric system or the XYZ colorimetric system can be obtained. The neural network learns the relationship between the colorimetric values and the known color separation values which are defined by the YMC(K) system, RGB system, or the like and correspond to the color sample. When this neural network is utilized in color correction, conversion from colorimetric values to color separation values can be realized. In addition, when the color separation values corresponding to the standard color sample are obtained using the image input device 20A to allow conversion of these values into colorimetric values, color separation values output from the image input device 20A can be converted into colorimetric values to be originally color-developed independently of the characteristics of the image input device 20A. Therefore, color reproducibility of a target color can be assured independently of the characteristics of the input and output devices 20A and 30.

After the learning processing, the neural networks are set using the corresponding parameters stored in the memory unit 14, and color separation value signals output from the color image input device 20A are color-converted and color-corrected in the image signal correction device 10. The color-corrected color separation value signals are supplied to the color image output device 30, and the color image output device 30 outputs a color image having a required color tone.

Figure 7:
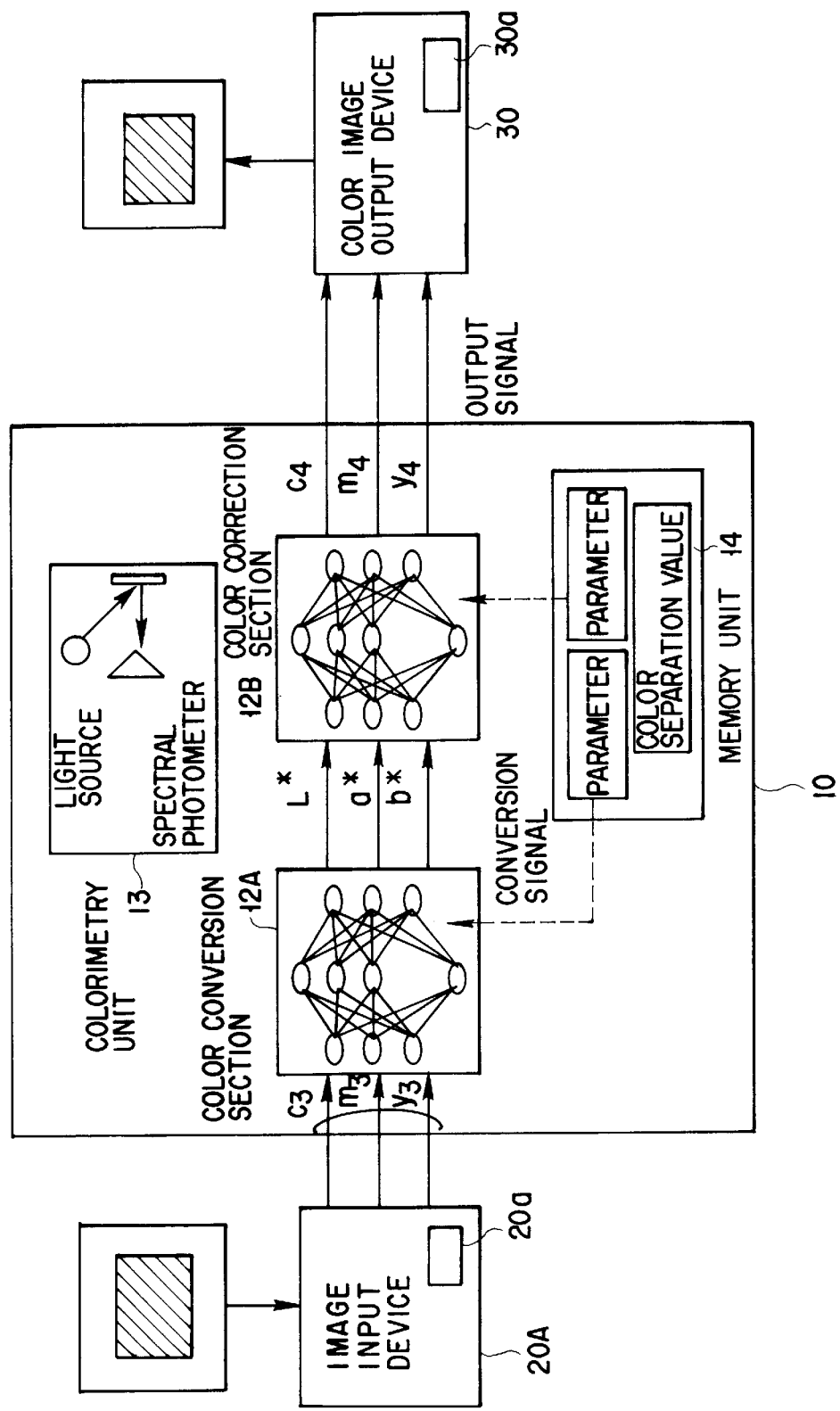
FIG. 7 is a functional block diagram showing an image output function of the color image reproduction system when an image input device connected to the image signal correction device shown in FIG. 2 is of a type for outputting color separation values.

Such an image output operation will be described below with reference to FIGS. 7 and 8.

Upon completion of the learning processing, an operator can read a required color image using the image input device 20A, and can output the read image from the color image output device 30. Such reproduction processing is executed by inputting a command upon operation of an input unit (not shown) such as a keyboard, and setting the image signal correction device in an image output mode. In the image output mode, the control unit 11 of the image signal correction device 10 reads out the parameters stored in the memory unit 14 and corresponding to the neural networks of the color conversion section 12A and the color correction section 12B, and sets the readout parameters in the corresponding neural networks (steps B1 and B3). When a color image on a sheet as an object to be read is read by the image input device 20A, the image input device 20A outputs color separation value signals (cmy signals) corresponding to the read color image (step B5).

The output cmy signals (those indicating values c3, m3, and y3 in FIG. 7) are supplied to the image signal correction device 10, and are stored in a predetermined memory area (frame memory). The control unit 11 sequentially inputs the stored cmy signals to the color conversion section 12A. The color conversion section 12A converts the cmy signals into colorimetric value signals ($L^*a^*b^*$ signals) (step B7). The colorimetric value signals converted and generated by the color conversion section 12A are supplied to the color correction section 12B (step B9).

The color correction section 12B converts the colorimetric value signals ($L^*a^*b^*$ signals) sent from the color conversion section 12A into color separation value signals (those indicating color separation values c4, m4, and y4) corresponding to the color image output device 30, so that the color image output device 30 can output a color image as a target to be reproduced (step B11). The color separation value signals converted by and output from the color correction section 12B are supplied to the color image output device 30 (step B13). The color image output device 30 outputs a color image having a color corresponding to the input color separation value signals.

As described above, when a required color image is to be output from the color image output device 30 using the image input device 20A for outputting color separation value signals corresponding to a read color image, if the sensors 20a and 30a detect a change in image reproduction environment, the above-mentioned learning processing is executed properly. Using the neural networks of the color conversion section 12A and the color correction section 12B which are optimized by the learning processing, signals output from the color image input device 20A are color-converted and then color-corrected. The color-corrected image signals (color separation value signals) are supplied to the color image output device 30, thereby reproducing a color image. The color image reproduced by the color image output device 30 is one corresponding to the color separation values which are converted on the basis of the colorimetric values of the standard color samples, thereby outputting a color image with a required color tone. Since the learning processing is properly executed in correspondence with detection of an environmental variation by the sensors 20a and 30a, the color image output device 30 can stably keep reproducing the same color in consideration of the device characteristics, including a physical change such as a change in temperature or humidity, of the image input device 20A and the color image output device 30, and characteristics which change upon a change in, e.g., color materials such as ink ribbons.

In the above operation, any data indicated by the output colorimetric value signals (step B5) and any data indicated by the converted signals (step B11) can be saved temporarily in a frame memory (not shown in figures). The frame memory has an ability to save those data corresponding to a design sheet all over. The control section 15 sequentially read out data from the frame memory.

The above-mentioned operation is executed when the signals output from the image input device are color separation values. A case will be described below wherein the image input device can output colorimetric values in place of color separation values. When the image input device 20B for outputting colorimetric values (L*a*b* values in this embodiment) corresponding to a color image is used, the image input device 20B is connected to the IF 15B provided to the image signal correction device 10.

In this case, since the outputs from the image input device 20B are colorimetric values (L*a*b* values), processing, executed by the color conversion section 12A, for converting color separation value signals into colorimetric value signals need not be executed. Therefore, the learning processing of the neural network is performed by only the color correction section 12B. The learning processing of the color correction section 12B is the same as that shown in steps A1 to A13 in the flow chart of FIG. 6. Therefore, a detailed description of the learning processing will be omitted. Note that the control unit 11 comprises detectors for detecting if the image input devices are connected to the IFs 15A and 15B since this learning processing must be distinguished from that executed when the image input device 20A is used. Thus, when the image input device 20A is connected to the IF 15A, the control unit 11 executes learning processing according to the above-mentioned flow chart of FIG. 6. When the image input device 20B is connected to the IF 15B, the control unit 11 executes, as learning processing, the processing shown in steps A1 to A13 in FIG. 6.

When image output processing is executed using the image input device 20B, the image output mode is set in the same manner as in a case wherein the image input device 20A is used. In this case as well, the control unit 11 executes different processing operations in accordance with the detection results of detectors provided to the IFs 15A and 15B.

Figure 9:
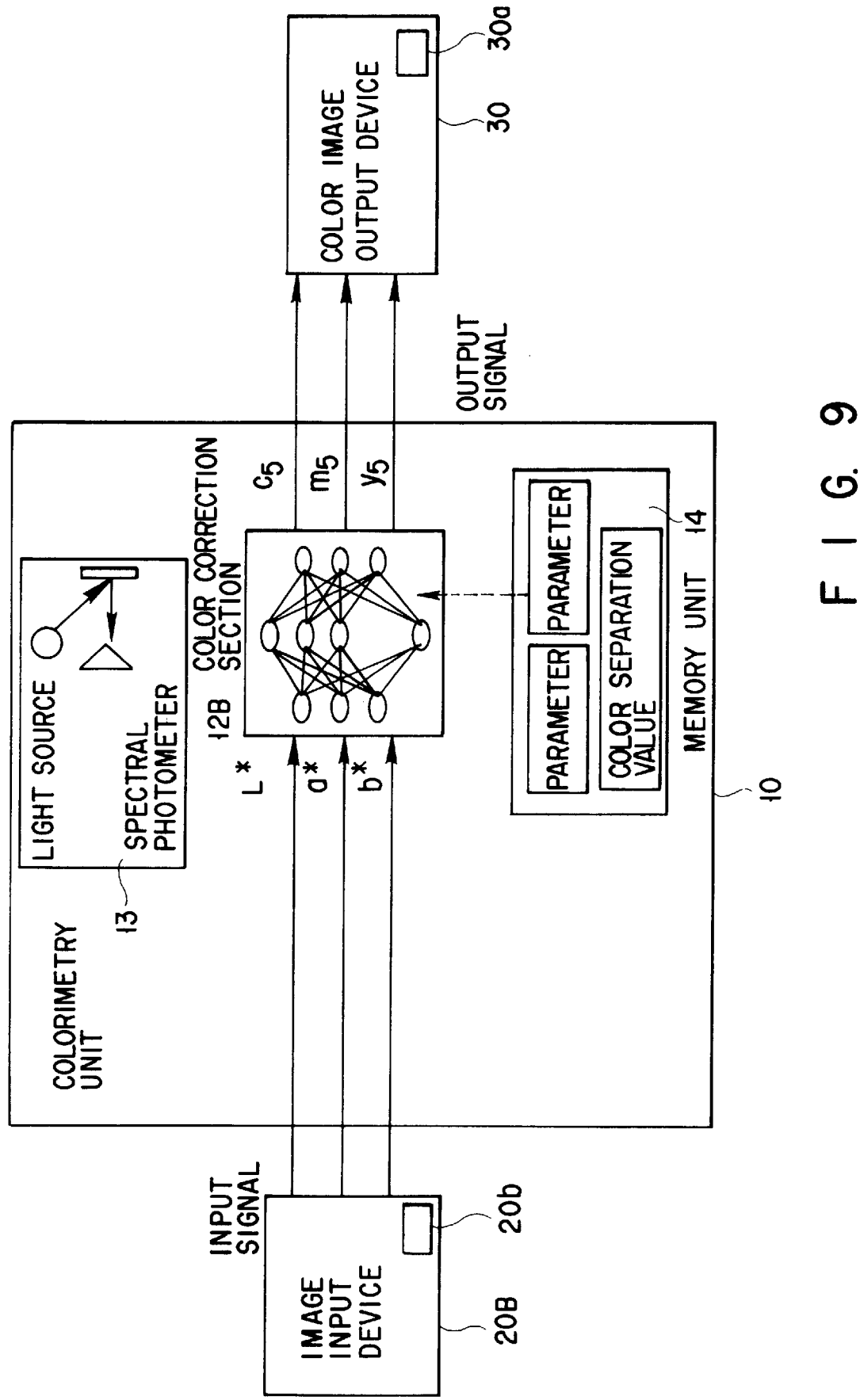
FIG. 9 is a functional block diagram showing an image output function of the color image reproduction system when an image input device connected to the image signal correction device shown in FIG. 2 is of a type for outputting colorimetric values.
Figure 11:
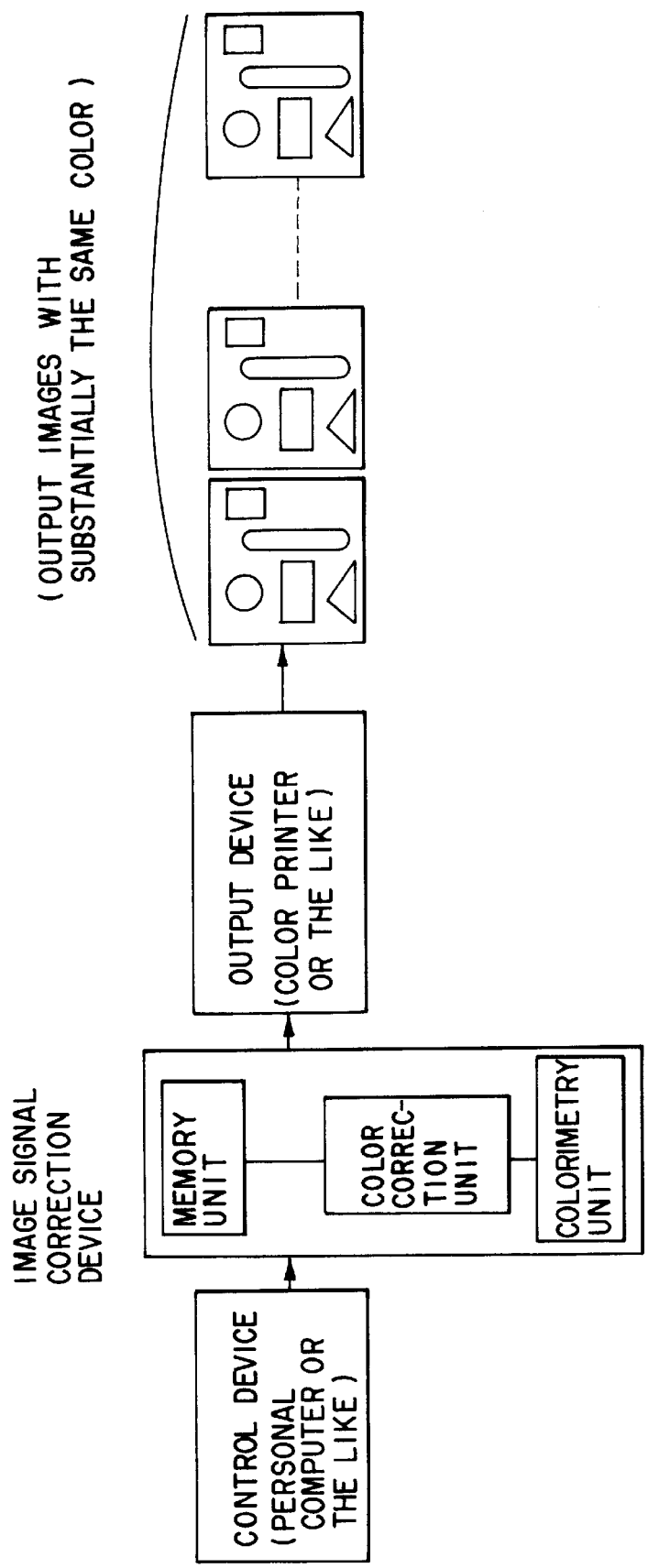
FIG. 11 is a block diagram for explaining that a color image having a target color is output by the color image reproduction system of the present invention.

An operation for outputting a color image using the image input device 20B will be described below with reference to FIGS. 9 and 10.

In the image output mode, the control unit 11 of the image signal correction device 10 reads out the parameters for the neural network of the color correction section 12B, which parameters are stored in the memory unit 14, and sets the readout parameters in the neural network (step C1). When a target color image is read by the image input device 20B, the image input device 20B outputs colorimetric value signals (L*a*b* signals) corresponding to the color image to the image signal correction device 10 (step C3).

The control unit 11 supplies the received colorimetric value signals (L*a*b* signals) to the color correction section 12B. The color correction section 12B converts the colorimetric value signals (L*a*b* signals) into color separation value signals (those indicating color separation values c5, m5, and y5) corresponding to the color image output device 30 (step C5). The converted color separation value signals are supplied to the color image output device 30 (step C7). The color image output device 30 outputs a color image in correspondence with the input color separation value signals.

As described above, when learning processing is properly executed in correspondence with detection of an environmental variation from the sensors 20b and 30a, the neural network of the color correction section 12B is optimized. The color image signals as colorimetric values output from the color image input device 21B are color-corrected using the neural network, and the corrected signals are output to the color image output device 30. Thus, the color image output device 30 can output a color image corresponding to colorimetric values which are converted on the basis of the colorimetric values of the standard color samples. Furthermore, since the learning processing is executed in correspondence with a change in image reproduction environment, the color image output devices can keep reproducing the same color independently of the device characteristics, including a physical change such as a change in temperature or humidity, of the image input device and the color image output device, and characteristics which change upon a change in, e.g., color materials such as ink ribbons.

The above-mentioned arrangement of the image signal correction device may be applied when a personal computer or the like is utilized as the image input device. More specifically, the personal computer can convert a color image signal (data) into colorimetric value data, and can output the colorimetric value data. For this reason, an operator or the like can connect the image input device 20B comprising the personal computer to the IF 15B shown in FIG. 2. Thereafter, the operator executes learning processing on the basis of the standard color sample CS output from the image output device 30 connected to the IF 15C. Upon completion of the learning processing, the operator can operate this color image reproduction system in the image output mode.

In the image output mode, the image input device 20B outputs colorimetric value signals as a color image signal. The colorimetric value signals are supplied to the color correction section 12B via the IF 15B. In the color correction section 12B, the colorimetric value signals are color-corrected, and corrected colorimetric value signals are supplied to the color image output device 30. The color image output device 30 outputs a color image in correspondence with the received corrected colorimetric value signals.

When the color image output device 30 is, e.g., a color printer, the print operation is continued while properly executing learning processing in correspondence with detection of the sensor 20b or 30a (e.g., when a large number of prints are to be output or when ink ribbons are exchanged). Thus, all prints can be output with the same color tones.

In the above embodiment, values in the CIE L*a*b* colorimetric system are used as the colorimetric values. Alternatively, other colorimetric values, e.g., those in the XYZ colorimetric system may be used. Also, as the color separation values, values in the RGB system may be used in addition to those in the CMY(K) system.

For example, the XYZ color system described above, a Yxy color system, L*u*v* color system, HVC Nunsell color system and the like may be applied to the color system of the present invention. Yxy values defined in the Yxy color system can be obtained by calculating the XYZ values. L*u*v* values defined in the L*u*v* color system equal to coordinate values of the uniform color space like the L*a*b* values. In HVC Munsell values defined in the HVC Munsell color system, the H represents the hue, the V represents the lightness, and the C represents the saturation.

As described above, according to the present invention, when a color image is output from a single color image output device, color reproducibility can be assured, so that identical colors can be reproduced for identical color image signals without being influenced by chemical and physical factors, e.g., a change in temperature or humidity condition, a change in ribbons or toners, and the like.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A color image signal correction system, comprising:
    colorimetry means for generating a first colorimetric value signal from a color sample having predetermined color separation values;
    first image input interface means for receiving a first color separation value signal for the color sample and then for a target color image, and receiving sensor detection of an environmental variation;
    image output interface means for outputting a second color separation value signal corresponding to the color sample and then to the target color image, and for receiving sensor detection of an environmental variation;
    color conversion means comprising a neural network for converting the first color separation value signal into a second colorimetric value signal in accordance with a first parameter;
    color correction means comprising a neural network for converting the first and then the second colorimetric value signals into the second color separation value signal in accordance with a second parameter; and
    control means for training the neural network of the color conversion means in response to the detection of the environmental variation by the sensor of the first image input interface means so that the first color separation value signal for the color sample is converted into the first colorimetric value signal for the color sample in order to set the first parameter, and training the neural network of the color correction means in response to the detection of the environmental variation by the sensor of the image output interface means so that the first colorimetric value signal for the color sample is converted into the second color separation value signal with the predetermined color separation values in order to set the second parameter.

2. A system according to claim 1, wherein the colorimetric value signals represent L*a*b* values defined in a CIE L*a*b* space.

3. A system according to claim 1, wherein the colorimetric value signals represent XYZ values defined in XYZ space.

4. A system according to claim 1, wherein the colorimetric value signals represent Yxy values defined in a Yxy space.

5. A system according to claim 1, wherein the colorimetric value signals represent L*u*v* values defined in a L*u*v* space.

6. A system according to claim 1, wherein the colorimetric value signals represent HVC Munsell values defined in a HVC Munsell space.

7. A system according to claim 1, wherein the color separation value signals represent CMY values of cyan (C), magenta (M), and yellow (Y).

8. A system according to claim 1, wherein the color separation value signals represent RGB values of red (R), green (G), and blue (B).

9. A system according to claim 1, wherein each of the first and second parameters includes a type of the image output means, the layer structure of said neural network, the number of units of each layer in the layer structure, and a weight associated with each unit.

10. A system according to claim 1, wherein each of said neural networks has at least three layers and each of said layers includes at least three units.

11. A system according to claim 1, wherein the color sample has a plurality of blocks with colors corresponding to different color separation value signals on the blocks.

12. An image signal correction system according to claim 1, and further comprising:
    color image output means connected to the image output interface means for outputting a color image in correspondence with the second color separation value signal and outputting the color sample in correspondence with the predetermined color separation values.

13. A method for reproducing a target color image comprising the steps of:
    a) enabling an image input device to read a target color image and generate a first set of color separation value signals corresponding to the target color image;
    b) inputting said first set of color separation value signals into a first neural network device for converting said first set of color separation value signals into a corresponding first set of colorimetric value signals in accordance with a first parameter;
    c) when an environmental variation of said image input device is detected by a sensor device associated with said image input device, controlling said first neural network device to adjust said first parameter in accordance with said environmental detected variation;
    d) inputting said first set of colorimetric value signals into a second neural network device for converting said first set of colorimetric value signals into a second set of color separation value signals in accordance with a second parameter;
    e) when an environmental variation of an image output device is detected by a sensor device associated with said image output device, controlling said second neural network device to adjust said second parameter; and
    f) inputting said second set of color separation value signals into an image output device to output a reproduction of said target color image.

14. The method for reproducing a target color image according to claim 13 wherein said step of controlling said second neural network includes:
    a) generating a color sample from said image output device, said color sample corresponding to predetermined color separation value signals;
    b) colorimetrically measuring said color sample and generating second colorimetric value signals corresponding therewith;
    c) inputting said second colorimetric value signals into said second neural network device in place of said first set of colorimetric value signals;
    d) inputting training signals into said second neural network device for adjusting said second parameter until said second set of color separation value signals correspond to said predetermined color separation value signals within a predetermined threshold.

15. The method for reproducing a target color image according to claim 14 wherein said step of controlling said first neural network includes:

substituting said color sample for said target color image; and inputting training signals into said first neural network device for adjusting said first parameter until said first set of colorimetric value signals correspond to said second set of colorimetric value signals within a predetermined threshold.

16. The method for reproducing a color image according to claim 15 wherein said first parameter comprises a type of the image input device, the layer structure of said neural network, the number of units of each layer in the layer structure, and a weight associated with each unit.

17. The method for reproducing a target color image according to claim 15, and further comprising storing said adjusted first parameter in a memory storage means.

18. The method for reproducing a color image according to claim 14 wherein said second parameter includes a type of the image output device, the layer structure of said neural network, the number of units of each layer in the layer structure, and a weight associated with each unit.

19. The method for reproducing a target color image according to claim 14 and further comprising storing said adjusted second parameter in a memory storage means.

20. A color image signal correction system, comprising:

colorimetry means for generating a first colorimetric value signal from a color sample having predetermined color separation values;

first image input interface means for receiving a first color separation value signal for the color sample and then for a target color image, and receiving sensor detection of an environmental variation;

second image input interface means for receiving a second colorimetric value signal for the color sample and then for the target color image, and receiving sensor detection of an environmental variation;

image output interface means for outputting a second color separation value signal corresponding to the color sample and then to the target color image, and for receiving sensor detection of an environmental variation;

color conversion means comprising a neural network for converting the first color separation value signal into a third colorimetric value signal in accordance with a first parameter;

color correction means comprising a neural network for converting the first and then the second or third colorimetric value signals into the second color separation value signal in accordance with a second parameter; and control means for selecting one of the second and third colorimetric value signals and, thereby, an operative one of the first and second image input interface means and for training the neural network of the color conversion means in response to the detection of the environmental variation by the sensor of the first image input interface means so that the first color separation value signal for the color sample is converted into the first colorimetric value signal for the color sample in order to set the first parameter, and training the neural network of the color correction means in response to the detection of the environmental variation by the sensor of one of the second image input interface means and the image output interface means so that the first colorimetric value signal for the color sample is converted into the second color separation value signal with the predetermined color separation values in order to set the second parameter.

* * * * *